United States Patent [19]

Anschuetz et al.

[11] Patent Number: 5,305,455

[45] Date of Patent: Apr. 19, 1994

[54] PER THREAD EXCEPTION MANAGEMENT FOR MULTITASKING MULTITHREADED OPERATING SYSTEM

[75] Inventors: Brigitte D. L. Anschuetz; Paul P. Giangarra; Jeffrey A. Grantz, all of Boca Raton; Michael S. Kogan, Delray Beach; Dean C. Oakes, Boynton Beach, all of Fla.; Steven M. Zanoni, Brookfield, Wis.

[73] Assignee: International Business Machines Corp., Armonk, N.Y.

[21] Appl. No.: 633,638

[22] Filed: Dec. 21, 1990

[51] Int. Cl.⁵ .............................................. G06F 9/46
[52] U.S. Cl. ................................ 395/700; 364/280.8; 364/975.4; 364/DIG. 1
[58] Field of Search ................... 364/DIG. 1, DIG. 2; 395/700, 600; 345/375, 700, 600

[56] References Cited

U.S. PATENT DOCUMENTS

| | | | |
|---|---|---|---|
| 4,475,156 | 10/1984 | Federico et al. | 364/300 |
| 4,779,187 | 10/1988 | Letwin | 364/200 |
| 4,835,685 | 5/1989 | Kun | 364/200 |

Primary Examiner—Thomas C. Lee
Assistant Examiner—Paul R. Lintz
Attorney, Agent, or Firm—Bruce D. Jobse; Anibal Jose Cortina

[57] ABSTRACT

A data processing system is operable in a multitasking mode to include at least one process having a plurality of threads. Exception management is done on a per thread basis, as opposed to a per process basis. Further, when a process termination exception occurs, each thread is accessed to execute any process termination exception handler associated with the thread.

3 Claims, 2 Drawing Sheets

PER THREAD EXCEPTION MANAGEMENT FOR MULTITASKING MULTITHREADED OPERATING SYSTEM

FIELD OF THE INVENTION

This invention relates to the field of data processing and, more particularly, to improvements in exception management in a data processing system controlled by a multitasking, multithreaded operating system whereby exceptions can be handled on a per thread basis.

BACKGROUND OF THE INVENTION

The well known OS/2 (TM) operating system has been commercially available for a few years and was initially designed as an operating system for personal computers using an Intel 80286 microprocessor. Early versions of OS/2 are considered 16 bit versions in view of the 16 bit architecture of the 80286 microprocessor. Current and future versions of OS/2 are considered 32 bit versions in view of the 32 bit architecture in microprocessors such as the 80386 and 80486. While an operating system is a collection of programs that provide many different functions, the general function to which the invention pertains is that of task management and, more specifically, exception management. The OS/2 operating system can operate the microprocessor in a protected mode to provide multitasking. Such system thus allows more than one program to be concurrently run. The general function of task management is to allocate resources to the different programs so that the various programs can be concurrently run in different time slices. Under OS/2, application programs are part of "threads" and "processes".

A process is an entity which owns system resources assigned to the process and includes at least one thread of execution. A thread is a dispatchable unit of work or string of instructions to be executed. A process can have more than one thread and in such case is considered "multithreaded". A concurrent application can be created as distinct processes or as multiple threads in a single process. Thread code is written in reentrant form so that the same code can be used concurrently in plural threads. In the latter case, each thread has access to the system resources owned by the process which includes the thread. In contrast, other operating systems allowing multitasking but each task is in reality a single process having a single thread.

Multiple threads in a process execute asynchronously of each other and as this happens, an "exception" may occur in one or more threads, and such action creates the problem which the invention overcomes as described in more detail below. An "exception" is a hardware related error or event that occurs during execution of instructions. The operating system is notified by the processor when the exception occurs, allowing an exception management function to "handle" the exception. The handler may be either a system handler or a user defined handler dependent on the type of exception. A system handler automatically handles certain exceptions over which the user has no control. For other exceptions, the user or application may define an exception handler which the user can optionally invoke through exception registration. If the user does not provide a user defined handler or invoke one properly, the system will automatically apply default actions. Heretofore, 16 bit OS/2 allows a user or programmer to define handlers for the following exceptions: a divide by 0 fault, an overflow trap, a bounds check fault, an invalid opcode fault, and a processor extension not present fault. By writing the handlers in reentrant form, plural copies of the same handler can be used.

Exception handling in 16 bit OS/2 is managed on a per process basis and this has created problems which the present invention improves upon and overcomes. Each thread registers an exception handler by using an application programming interface (API) call and this causes an entry to be made in the exception vector of the kernel per process data area. The exception vector is common to all threads within the process and contains a table of pointers to handlers that have been registered. The pointers are stored in the table in accordance with the type of exception. Each thread has access to all pointers or table entries. This creates a problem in the situation where a first thread registers its own handler for a given type of exception and subsequently a second thread registers its own handler for the same type whereby the first pointer is overwritten. Should the exception occur while the first thread is executing, the second handler will be executed without informing the first handler that it is not the one originally registered. In other words, the threads have access to the table and can unknowingly corrupt access to handlers of other threads sharing the exception vector.

A second problem can occur when a first thread has requested from a subsystem a transaction that must complete. For example, a thread might request data from a remote data base subsystem. Suppose then that a second thread is executing and causes an abnormal termination to occur. Such exceptions are handled on a per process basis, and the whole process is terminated without notifying individual threads and allowing them a chance to terminate gracefully. In the example cited, the thread in the remote data base system never gets a chance to roll back its transaction, potentially causing integrity problems in the remote data base.

SUMMARY OF THE INVENTION

In view of the foregoing, one of the objects of the invention is to provide a data processing system having a multitasking operating system including a multithreaded process model, in which exceptions are managed on a per thread basis.

Another object of the invention is to provide a data processing system in which a process termination exception is delivered to each thread of the process that is terminating.

Still another object of the invention is to allow all threads in a process the option of handling, by user defined handlers, a process termination exception prior to actual termination of the process incorporating such threads.

Briefly, in accordance with the invention, a data processing system is operable in a multitasking mode to include at least one process having a plurality of threads. Exception management is done on a per thread basis, as opposed to a per process basis. Further, when a process termination exception occurs, each thread is accessed to execute any process termination exception handler associated with the thread.

DRAWINGS

Other objects and advantages of the invention will be apparent from the following description taken in connection with the accompanying drawings wherein:

FIG. 1 is a block diagram of a data processing system embodying the invention; and FIG. 2 is a more detailed block diagram of a portion of the system shown in FIG. 1.

DETAILED DESCRIPTION

Figure 1:
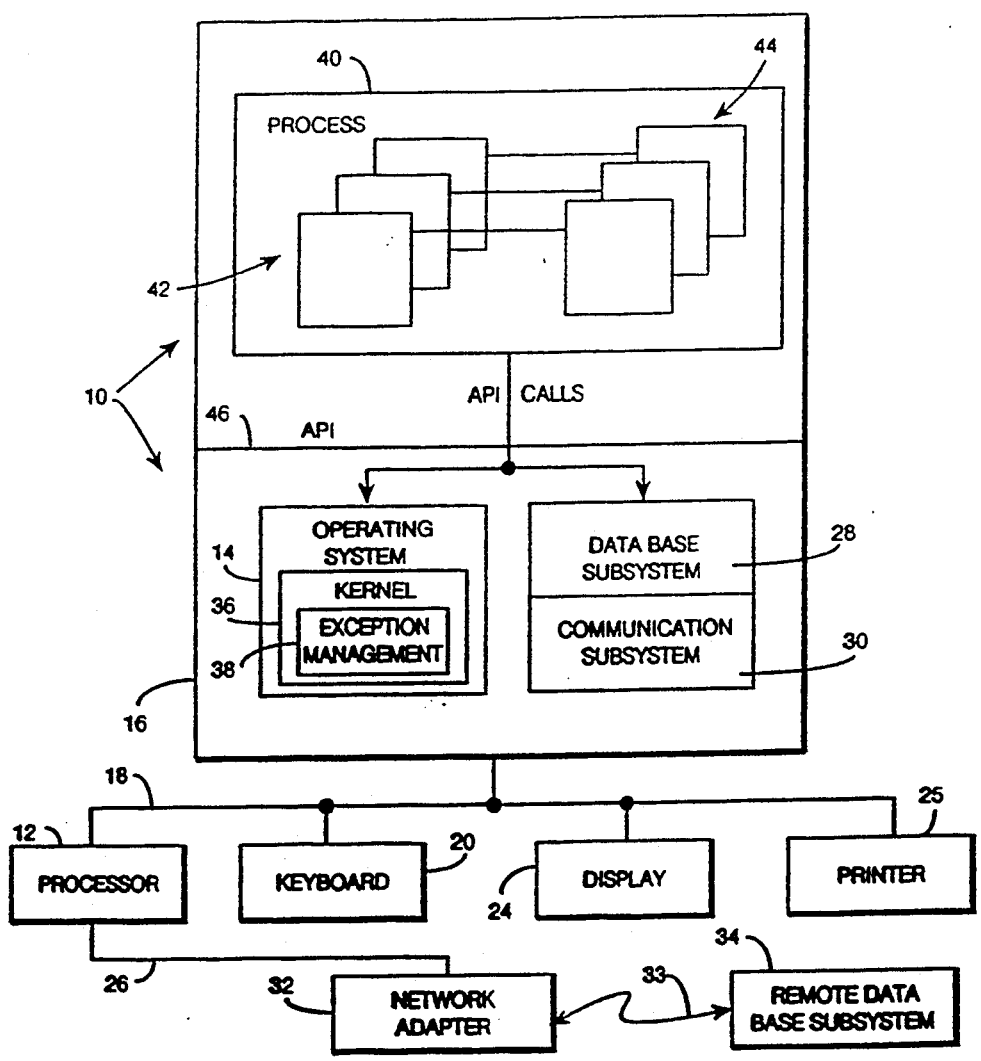

Referring now to the drawings and first to FIG. 1, there is shown an exemplary data processing system that is the combination of a personal computer 10 and software including an operating system 14. Computer 10 includes a processor 12 that is preferably a 80386 or a 80486 microprocessor operable in a protected mode to allow multiple tasks to be concurrently executed under the control of an operating system 14 stored in a memory 16. Processor 12 is connected over a system bus 18 to a keyboard 20, a display 22, and a printer 24. Processor 12 is further connected over an expansion bus 26 to a network adapter 32 which in turn is connected over a network or transmission line 33 to a remote data base system 34.

Operating system (OS) 14 preferably is of a 32 bit type designed to take advantage of the 32 bit architecture of the aforementioned 80386 and 80486 microprocessors. OS 14 includes a kernel 36 and a thread exception management function or routine 38. A process 40 is also created in memory 16 and under the control of OS 14. Process 40 has a plurality of threads 42 and thread exception data areas 44. One thread in a process is created at the time of creation of the process and additional threads are dynamically created in the process by system calls through API 46 using the conventional DosCreateThread API. Memory 16 may also store a data base subsystem 28 and a communication subsystem 30 which are both usable by process 40 by issuing function calls through API 46. It is to be noted that additional processes (not shown) can be created in the system concurrently with process 40.

Such a system affords an application programmer the opportunity to break up a complex program into independent threads that can be concurrently executed as multiple tasks. For example, a complex spreadsheet program can provide one thread to control input from the keyboard, another thread to control the printer, and another thread to control recalculating the spreadsheet. This would allow use of the keyboard while printing or recalculating. A further thread might control importing data into the spreadsheet from the remote data base system, and thus create the environment in which one of the problem examples discussed above, might occur.

Such arrangement of a multitasking system was chosen to illustrate a typical environment for which the invention is especially useful, and it should be obvious to those skilled in the art that various other arrangements can be used. Except for the manner in which user-defined exception handlers are used to manage exceptions on a per thread basis and to handle process termination exceptions, the illustrated data processing system is constructed in accordance with principles known to those skilled in the art, so that further details thereof not necessary to an understanding of the invention are omitted herefrom. It is to be understood that the many support, I/0 and other devices commonly included in a data processing system have been omitted for simplicity of illustration. Further, since operating systems normally perform a wide variety of functions, only those germane to the invention are described herein.

Figure 2:
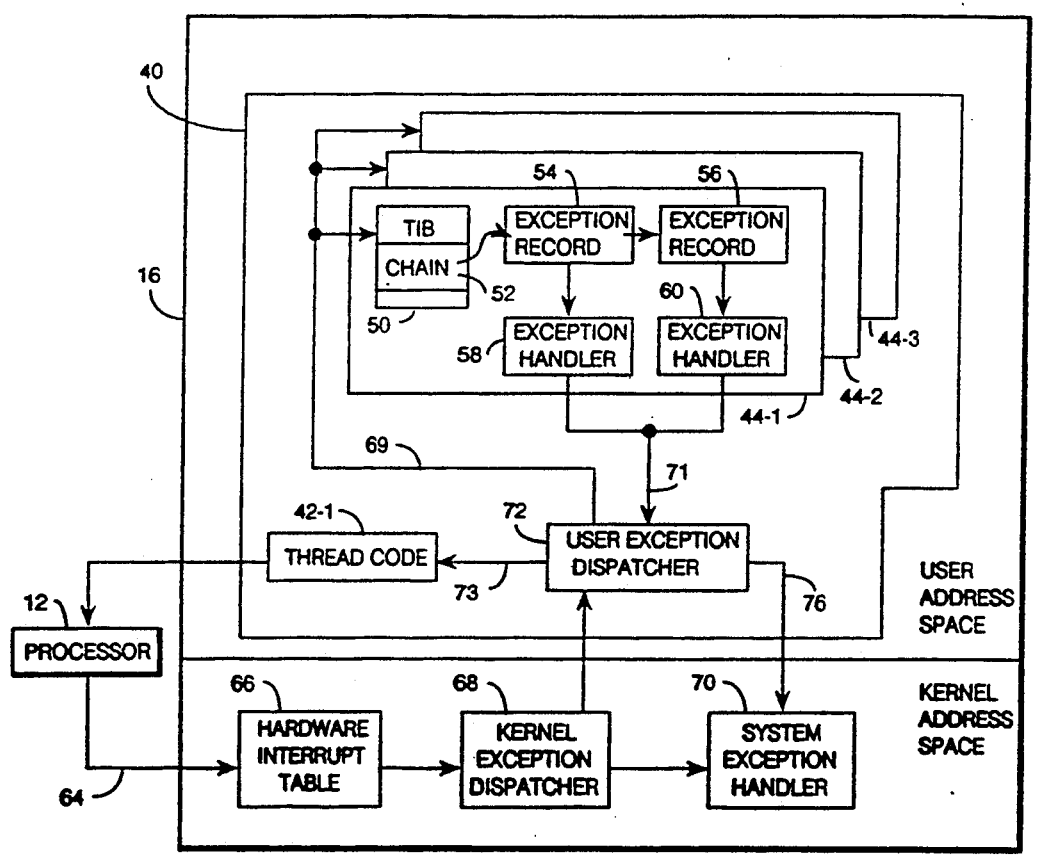

FIG. 2 illustrates the invention relative to a single, multithreaded process 40 being created in user address space in memory 16. Within such illustration, it has been assumed that process 40 and threads 42-1 through 42-3 have already been created. Process 40 includes thread 42-1 when the process was created and the additional threads were dynamically created by system calls through API 46. At the time each thread is created, a corresponding thread data structure is created that includes a thread information block (TIB) 50 in which is stored information including a chain pointer 52 settable to point to the head of a chain of exception records and user defined exception handlers, or to zero indicating there is no such chain. In FIG. 2, pointer 52 points to records 54 and 56. Each exception record is for a different exception and points to a user defined exception handler for the particular type of exception. Thus as illustrated, records 52 and 56 point to exception handlers 58 and 60 respectively. Each exception record identifies the type of exception that can be handled by the associated handler. Each exception record further points to the next record in the chain or is set to zero indicating there is no further record.

Assume that thread code 42-1 has been granted a time slice during which an instruction is executed that causes an exception to occur in a piece of processor 12. For example, the instruction might be an invalid opcode which when executed by the processor produces an invalid opcode fault. Processor 12 then dispatches the exception to the operating system using a hardware interrupt table 66. Control is transferred to a kernel exception dispatcher 68 which decides if the exception is a system exception or a user exception. Dispatcher 68 invokes a system exception handler 70 or a user exception dispatcher 72 dependent on the type of exception.

Dispatcher 72 performs two types of searches dependent on whether or not the exception is a process termination exception. If it is not such an exception, dispatcher 72 accesses by step 69 the TIB associated with the thread from which the exception arose and using the chain pointer searches the chain of exception handlers to find one for handling the particular exception. If the chain doesn't exist, i.e., there is no user defined handler registered for such thread, or if a chain exists and there is no handler for the particular exception, step 76 notifies the system exception handler 70 of a default allowing 70 to invoke default handling which normally terminates the process. If a handler exists on the chain for handling the exception, it will be executed and a return made to dispatcher 72 by step 71. Dispatcher 72 then returns by step 73 to thread code 42-1 at the next instruction following the instruction giving rise to the exception.

An abnormal process termination exception is a new exception created as part of the invention and is generated by the operating system when process termination occurs. By way of example, process termination can occur when a thread calls the API to voluntarily terminate the process. Involuntary or abnormal termination occurs when an exception is not handled and the default action for that exception is process termination. If the exception is to terminate the process, dispatcher 72 then sequentially accesses all of the threads by step 69 and searches through each chain to determine if it includes a handler for such exception. If it does, the handler is then executed. Within the illustrative embodiment, assume that handler 60 is a termination exception handler. The search would first obtain pointer 52 and access record to locate handler 58. Upon determining that such handler is not the one to handle process termination exceptions, the search would then access record 56 and handler 60. It would then be dispatched for execution. Afterwards, a return is made to dispatcher 72 to complete searching through all of the exception handling chains of all threads within the process thereby allowing each thread to optionally execute a user defined process termination exception handler. Afterwards, dispatcher 72 returns by step 76 to system exception handler 70 allowing the process to be terminated. This capability thus allows a user to define, as appropriate to the thread, a must-complete handler that allows the thread to terminate gracefully without damaging or corrupting the system. Obviously, the details of such a handler are up to the application programmer.

The main advantages of the invention include the following. First, the exception data structures are allocated on a per thread basis and are separated from those of other threads. Second, exception handlers are dispatched on a per thread basis. Third, in the event of process termination, each thread is given the option of handling a process termination exception allowing critical actions to complete or be recovered.

It should be apparent to those skilled in the art that many changes can be made in the details and arrangements of steps and parts without departing from the scope of the invention as defined in the appended claims.

What is claimed is:

1. A multitasking data processing system comprising:
   a memory system having an address space divided into a user address space (UAS) and a kernel address space (KAS);
   a process stored in said UAS, said process owning system resources assigned to said process, said process comprising a plurality of threads, each thread being a dispatchable unit of work having access to said system resources owned by said process;
   a multitasking operating system kernel stored in said KAS including means for handling user exception son a per thread basis;
   a processor for selectively executing said process out of said UAS and for selectively executing said operating system out of said KAS, said processor being operative to notify said operating system when exceptions occur, which exceptions include an abnormal process termination exception arising during execution of one of said threads;
   said operating system comprising a kernel exception dispatcher operative to receive exception notifications from said processor and, in response thereto, dispatch exceptions to said process;
   a subsystem accessible during execution of another thread for performing a transaction for said another thread;
   said process further comprising
      a plurality of user defined handlers for handling exceptions caused by execution of respective ones of said threads, said user defined handlers including an abnormal process termination exception handler for handling said abnormal process termination for said another thread by completing said transaction prior to abnormal termination of said process, and
      a user exception dispatcher for receiving exceptions dispatched from said kernel exception dispatcher and, in response thereto, selectively dispatching user defined handlers for handling exceptions dispatched thereto, said user exception dispatcher being operable, in response to receiving said abnormal process termination exception, to sequentially search through said plurality of user defined handlers for said plurality of threads to locate said abnormal process termination handler and to dispatch said abnormal process termination exception handler, prior to abnormal termination of said process.

2. A data processing system in accordance with claim 1 wherein said user defined handlers are linked to said user exception dispatcher by chains with each chain containing handlers for handling exceptions for only one of said threads.

3. A data processing system in accordance with claim 2 wherein:
   said process comprises a plurality of abnormal termination exception handlers for different threads; and
   said user dispatcher searches said chains and dispatches all of said termination exception handlers, prior to termination of said process.

* * * * *